Nov. 11, 1952     F. SCHMIEDER     2,617,357
CHECK DISPENSING BUSINESS MACHINE
Filed Aug. 16, 1949     3 Sheets-Sheet 1

Inventor:
Fritz Schmieder
by Knight Bros., Attorney
by Ray J. Ernst (1358)
Authorized Signature Nov. 11, 1952   F. SCHMIEDER   2,617,357
CHECK DISPENSING BUSINESS MACHINE Filed Aug. 16, 1949   3 Sheets-Sheet 3

Inventor
Fritz Schmieder
by Knight Bros., attorneys
by Ray J. Ernst (1135A)
Authorized Signature Patented Nov. 11, 1952

2,617,357

UNITED STATES PATENT OFFICE 2,617,357

CHECK DISPENSING BUSINESS MACHINE

Fritz Schmieder, Bielefeld, Germany, assignor to Anker-Werke, A. G., Bielefeld, Germany, a corporation of Germany Application August 16, 1949, Serial No. 110,543

3 Claims. (Cl. 101—288)

1

The invention relates to cash registers, accounting machines or the like business machines capable of selectively issuing a single check or a double check.

The check dispensing apparatus of the known machines of this type either issue a single check of the same length as the double check, or they issue a single check of half the length of the double check. Apparatus of the latter kind reduce the check tape consumption to one half when issuing single checks.

Experience has shown that the double check also may be kept shorter than customary because one portion of it, as a rule, is needed only for supervisory or auditing purposes. It is, therefore, an object of the invention to provide a selective check issuing business machine which, when set for the issuance of a double check, dispenses a check of shorter length than the known machines, thus further reducing the tape consumption and hence requiring a less frequent insertion of a new roll of check tape. Another object of the invention is to achieve the just-mentioned improved performance by simple and reliable means of minimum space requirements. An object of the invention is also to devise a machine that issues only a check of one kind, for instance only a single check, whenever the machine performs a predetermined operation such as the totalizing of several additive amounts.

These and other objects and as well as the features of the invention will be apparent from the embodiments of the invention described in the following and shown on the drawing, in which.

Figure 3:
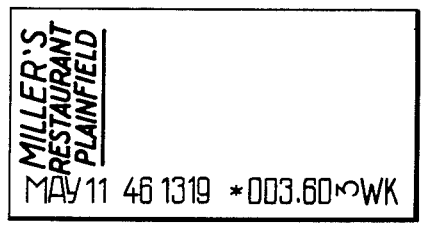
Figure 4:
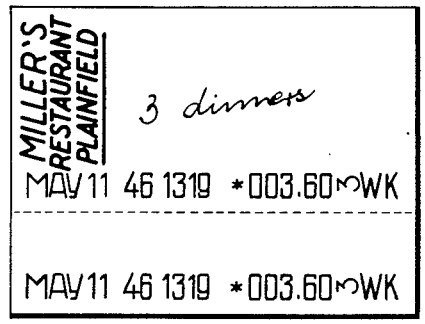

Figs. 3 and 4 exemplify, respectively, a single check and a double check of the kind issued by the machine; and Fig. 5 shows separately a side view of some of the parts of the machine.

Figure 1:
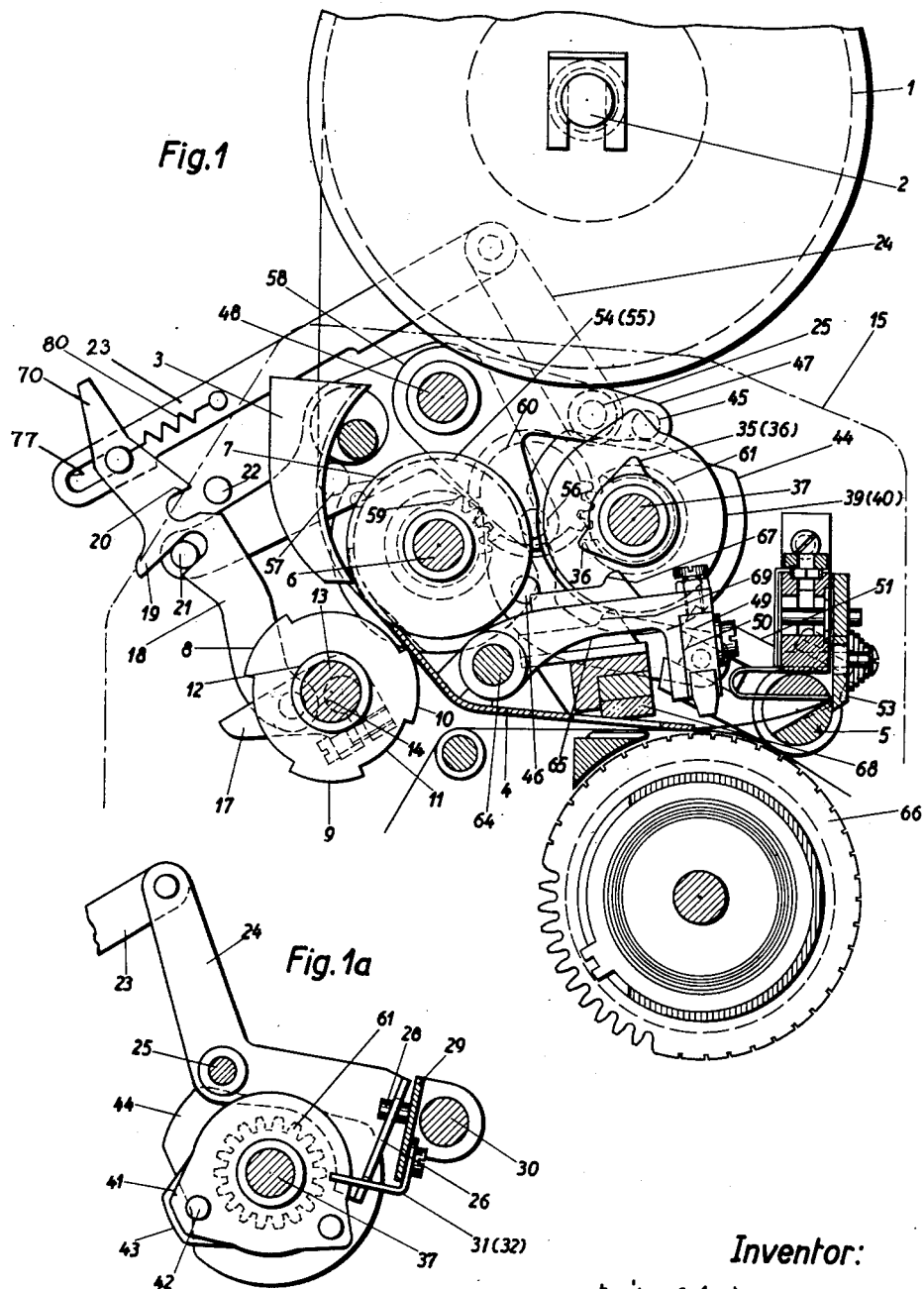
Figure 1 shows a sectional side view of the printing and tape accommodating apparatus of the machine, and Fig. 1a a detail thereof.

According to Fig. 1, a roll of check tape I is disposed on a shaft 2 in the upper part of the printing mechanism of a cash register or the like business machine. The check tape passes through a chute 3 along a paper guide 4 to the cutter 5.

Figure 2:
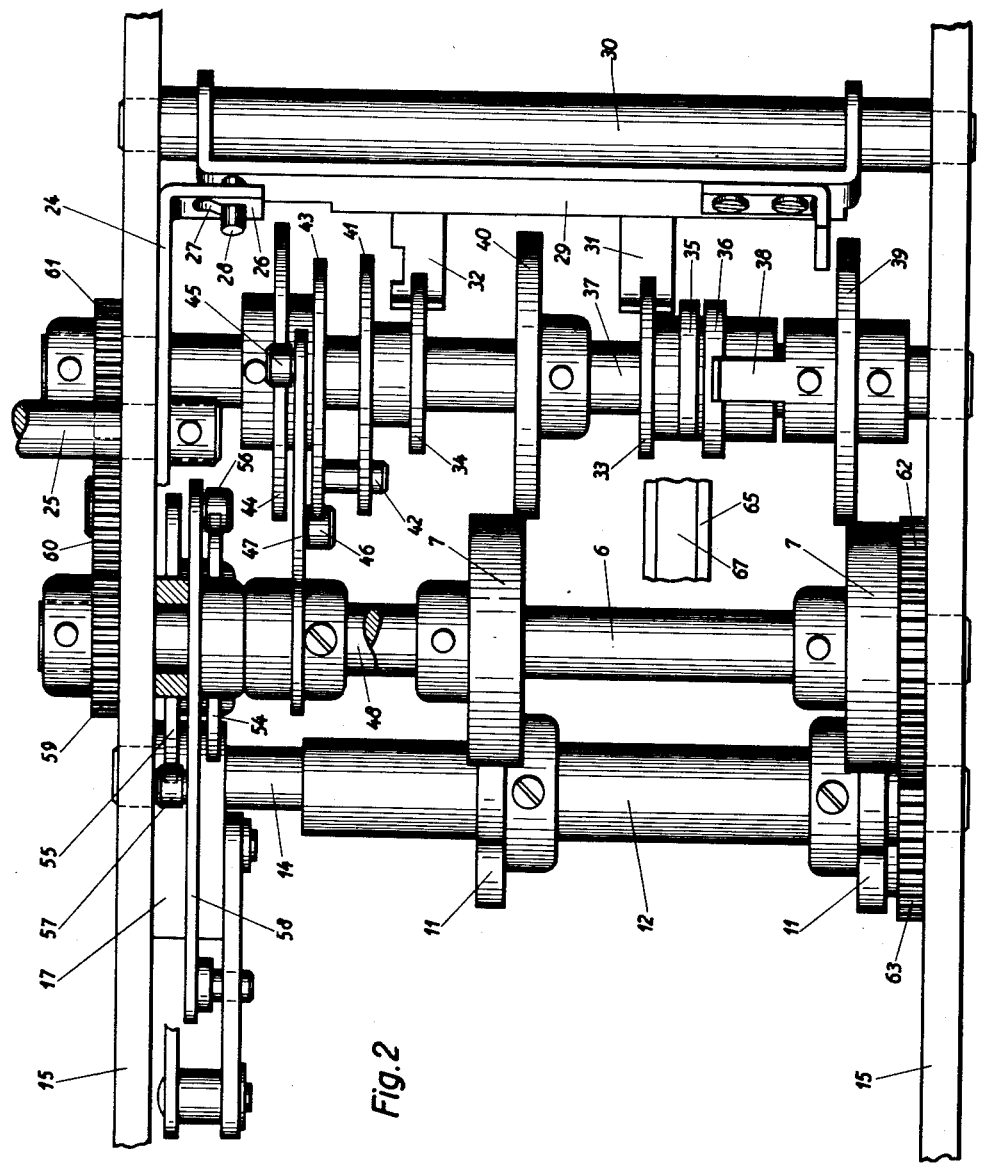
Fig. 2 shows a plan view of the control elements of the same machine.

The tape is advanced by a feeding device designed as follows. A drive shaft 6 carries two rubber cylinders 7 against which the check tape is pressed by contact edges or projections 8, 9, 10 of two transport cams 11 (Figs. 1, 2). In the

2 illustrated embodiment the edges have substantially equal peripheral lengths and are substantially equally spaced from one another. The cams 11 are firmly secured on a sleeve 12 journalled on a shaft 13. Shaft 13 has eccentric extensions 14 journalled in a wall or frame structure 15.

An arm 17 is firmly clamped onto one of the eccentric extensions 14 (Fig. 1). A pawl 18, pivoted on arm 17, has two recesses 19, 20 selectively engageable with a movable pin 21 and a stationary pin 22, respectively. The pawl 18 is linked by a connecting rod 23 to a cam arm 24. Arm 24 is secured to a control shaft 25 and has an angularly bent end 26 (Figs. 1a, 2) with a cam slot 27 (Fig. 2) engaged by a pin 28. Pin 28 is mounted on a bridge 29 which is displaceable but not revolvable on a shaft 30. The bridge 29 carries fork members 31, 32 which straddle respective guide discs 33, 34.

Guide disc 33 is firmly connected with two cams 35, 36 and is journalled on a shaft 37. Cams 35, 36 have a clutch member which in the illustrated position (Fig. 2) is engaged by a driving clutch member 38 of a cam 39 pinned on the shaft 37 to revolve together with the shaft. Another cam 40 similar to cam 39 is also pinned on shaft 37. The guide disc 34 is firmly connected with a cam 41 and revolvably mounted on the shaft 37. In the illustrated axial position of the displaceable cam 41, this cam is engaged by a drive pin 42 mounted on a cam 43. Cam 43 and another cam 44 are rigidly secured on the shaft 37. Two rollers 45, 46 of a follower lever 47 coact with respective cams 43, 44. Lever 47 is revolvably mounted on a shaft 48 (Figs. 1, 2) and has an extension 49 which carries a slide piece 50 (Fig. 1) straddled by a bifurcated arm 51. Arm 51 is secured to the revolvable cutter 5 for actuating the cutter. A stationary cutter plate 53 cooperates with cutter 5.

Two other cams 54, 55 (Fig. 2) are rigidly attached to the shaft 6 and cooperate with respective cam rollers 56, 57 of a follower lever 58 (Figs. 1, 2) pivoted about the shaft 48. The above-mentioned pin 21 is riveted to an extension of the lever 58 (Fig. 1). Shafts 6 and 37 (Figs. 1, 2) are geared together by spur gears 59, 60, 61. Two further spur gears 62, 63 transmit the tape transport movement. Gear 62, mounted on shaft 6 and thus connected with one of the rubber cylinders 7, meshes with the gear 63 mounted on the sleeve 12.

A shaft 64 (Fig. 1) carries a printing hammer 65 to cooperate with the type wheels 66. The printing hammer 65 has a back member 67 which cooperates with one or the other cam 35 and 36 (Figs. 1, 2) depending upon the adjustment of these cams along the axis of the cam shaft 37. A cliché hammer 68 has two back members 69 to cooperate with cams 39 and 40.

If a single check is to be dispensed, the control parts are adjusted to the respective positions shown in Fig. 1. In these positions, the recess 19 of pawl 18 straddles the pin 21. At the beginning of the machine operation, the lever 58 is first turned counterclockwise (Fig. 1) due to the action of cams 54, 55. As a result, pin 21 of lever 58 causes pawl 18 to move the arm 17 counterclockwise (Fig. 1) about the axis of the eccentric extensions 14 of shaft 13. Thus, the sleeve 12 with tape transport cams 11 is moved so that only the contact edges 9 and 10 of the transport cams 11 become effective to advance the check tape during the course of the machine operation. During the dead interval, corresponding to the peripheral spacing between cam edges 8 and 9, the amount-printing hammer 65 is actuated by cam 35, and the cliché-printing hammer 68 is actuated by cams 39, 40. Prior to the advance of the check tape, the cutter 5 is turned clockwise (Fig. 1) by parts 47, 49, 50, 51 to a position in which its cutting edge is sufficiently spaced from that of the cutter plate 53 to permit the free passage of the check tape. After the printing and advancing of the check tape, the cutter 5 returns to its original position, thus cutting the printed check from the tape.

If a double check is to be dispensed, the control shaft 25 is turned, for instance under control by an operator-actuable key or button, so that the recess 20 of pawl 18 moves over the stationary pin 22 (Fig. 1). The control shaft 25, by means of parts 24, 26, 27, 28 causes a displacement of the bridge 29 along shaft 30 (Fig. 2). As a result the bifurcated member 32 shifts disc 34 along shaft 37 and thus places the cam 41 into the operating range of the roller 46 of follower lever 47. Simultaneously, the bifurcated member 31 shifts cam 33 and thus places the cam 36 into the range of the back member 67 of the amount-printing hammer 65. At the beginning of the machine operation, the lever 58 is moved counterclockwise (Fig. 1.) Now, however, this movement has no effect on the pawl 18, because the pawl is beyond the range of movement of pin 21. Consequently, during the machine operation, all contact edges 8, 9, and 10 of cams 11 are now effective to advance the check tape. Prior to the advancing movement of the check tape, the amount to be registered is printed under control by cam 36 which is now located within the range of the back member 67 of printing hammer 65. For an interval of time after the first contact edge 8 has advanced the tape and before edge 9 engages the tape, the tape remains at rest. During that interval, the amount-printing hammer 65 and the cliché hammer 68 are actuated to print one portion of the check. Immediately thereafter the contact edge 9 advances the tape another step. Then the cutter 5 is turned a smaller angle than before to emboss or perforate a tear line on the tape. This occurs under control by cam 41 which, as mentioned, has been placed into the range of the roller 46 of the lever 47. Before the next contact edge 10 engages the tape, the cutter 5 is turned back to the open position under control by cam 44 so that the contact edge 10 can advance the check tape a further amount. Near the end of the machine operation and as described above, the cutter 5 is turned the full amount in order to sever the printed check from the tape.

In order to always issue the same kind of check, namely a single check, whenever the machine is operated to take a total or subtotal, the device is designed as described in the following with particular reference to Fig. 5.

The pawl 18 has an extension 70 to cooperate with the pin 71 of a connecting rod 72. Rod 72 is linked to a bell crank lever 73 pivoted on a shaft 78. A roller 74 on lever 73 engages the cam slot 75 of a cam member 76 mounted on a shaft 79. The angular position of shaft 79 is controlled by the operation adjusting means or control keys (not illustrated) of the machine. The connecting rod 23 has an elongated hole 77. Pawl 18 is resiliently connected with the connecting rod 23 of a spring 80.

If a total or subtotal is to be taken, shaft 79 and cam member 76 are turned clockwise. As a result, the pin 71 moves toward the extension 70 of pawl 18 and either retains it or places it in the position shown by solid lines in Fig. 1. As explained, only single checks are dispensed in this position of the pawl 18 The pin 71 thus forms a displaceable stop which retains the pawl 18 in the adjustment for issuing a single check whenever a total or subtotal is taken, regardless of the angular position to which the control shaft 25 may then be set. That is, for instance, when shaft 25 is set for issuance of a double check, the machine normally issues such checks but is automatically controlled to issue a single check when a total is drawn.

After a study of this disclosure, it will be obvious to those skilled in the art that, as far as design and details are concerned, the invention permits various modifications without departure from its essential features as set forth in the claims annexed hereto.

I claim:

1. A check dispensing business machine, comprising operator-actuable selector means for setting the machine to perform different respective registering operations including total and subtotal operations, means for accommodating a check tape, a tape feeding device having a revolvable cam with a number of cam projections peripherally evenly spaced from one another and engageable with the tape for imparting respective steps of feed movement to the tape, a shaft having eccentric journal means and revolvably carrying said cam, a pawl member pivoted to said journal means, selectively operator-adjustable control means spring-connected with said pawl member to adjust said pawl member between two positions for correspondingly setting the eccentricity of said shaft to make a smaller and larger number respectively of said cam projections engage the tape for issuing a single check and a double check respectively, and displaceable stop means connected with said selector means and having a position depending upon the selected registering operation, said stop means being positioned in the path of said pawl member and engageable by said pawl member to retain it in single-check position when said selector means are set for total and subtotal operations regardless of the setting of said control means.

2. A check dispensing business machine, comprising operator-actuable selector means for setting the machine for individual and totalizing operations respectively, means for accommodating a check tape, a tape feeding device having movable and sequentially arranged transport elements successively engageable with the tape for imparting respective steps of feed movement thereto, said feeding device comprising a selectively adjustable control member having one position in which a given number of said elements are operative for issuing a single check and a second position in which an additional smaller number of said elements are also operative for issuing a double check, operator-adjustable control means having two selective adjustments and having a yieldable connection with said control member for normally setting said control member to either of said two positions, and a displaceable stop connected with said selector means and having a stop location dependent upon the selected machine operation, said stop when in a given stop location being engageable with said control member to then retain said control member in a given one of said two positions, whereby only one kind of check is dispensed when said selector means are set for a predetermined one of said machine operations regardless of the adjustment of said control means.

3. A check dispensing business machine, comprising operator-actuable selector means for setting the machine to perform different respective registering operations including total and subtotal operations, means for accommodating a check tape, a tape feeding device having transport elements for imparting respective steps of feed movement to the tape, said feeding device comprising a selectively adjustable control member having one position in which a given number of said elements are operative for issuing a single check and a second position in which an additional smaller number of said elements are also operative for issuing a double check, operator-adjustable control means having two selective adjustments and having a yieldable connection with said control member for normally setting said control member to either of said two positions, and mechanism connected with said selector means and having a displaceable stop located in the path of said control member only when said selector means are set for totalizing operations to then limit said feeding device to issuing single checks regardless of the adjustment of said control means.

FRITZ SCHMIEDER.

REFERENCES CITED

The following references are of record in the file of this patent:

UNITED STATES PATENTS

| Number | Name | Date |
|---|---|---|
| 1,795,509 | Robertson | Mar. 10, 1931 |
| 1,934,003 | Radermacher et al. | Nov. 7, 1933 |
| 1,964,552 | Arnold | June 26, 1934 |
| 2,154,381 | Gruver | Apr. 11, 1939 |
| 2,158,150 | Ranglack | May 16, 1939 |
| 2,181,990 | Fuller | Dec. 5, 1939 |
| 2,238,517 | Colley et al. | Apr. 15, 1941 |